(12) United States Patent
Yarlagadda et al.

(10) Patent No.: US 12,106,067 B2
(45) Date of Patent: Oct. 1, 2024

(54) VOICE ASSISTANT SYSTEM AND METHOD FOR PERFORMING VOICE ACTIVATED MACHINE TRANSLATION

(71) Applicant: JPMorgan Chase Bank, N.A., New York, NY (US)

(72) Inventors: Sitaram Yarlagadda, Plano, TX (US); Ananth Hegde, Frisco, TX (US); Srikanth Rangabhatla, Plano, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 308 days.

(21) Appl. No.: 17/648,778

(22) Filed: Jan. 24, 2022

(65) Prior Publication Data
US 2023/0237281 A1    Jul. 27, 2023

(51) Int. Cl.
| | |
|---|---|
| *G06F 40/58* | (2020.01) |
| *G06F 16/245* | (2019.01) |
| *G06F 16/2452* | (2019.01) |
| *G06F 16/33* | (2019.01) |
| *G06F 16/332* | (2019.01) |
| *G06F 40/166* | (2020.01) |
| *G06F 40/279* | (2020.01) |
| *G06N 20/00* | (2019.01) |
| *G10L 13/02* | (2013.01) |
| *G10L 15/22* | (2006.01) |

(Continued)

(52) U.S. Cl.
CPC .......... *G06F 40/58* (2020.01); *G06F 16/245* (2019.01); *G06F 16/2452* (2019.01); *G06F 16/3329* (2019.01); *G06F 16/3344* (2019.01); *G06F 40/166* (2020.01); *G06F 40/279* (2020.01); *G06N 20/00* (2019.01); *G10L 13/02* (2013.01); *G10L 15/22* (2013.01); *G10L 17/06* (2013.01); *G10L 17/22* (2013.01)

(58) Field of Classification Search
CPC ............ G06F 16/3329; G06F 16/2452; G06F 16/24522; G06F 16/245; G10L 15/22; G10L 13/02; G10L 17/22
See application file for complete search history.

(56) References Cited

U.S. PATENT DOCUMENTS

| | | | |
|---|---|---|---|
| 2001/0047251 A1* | 11/2001 | Kemp | G06F 30/13 703/1 |
| 2003/0055649 A1* | 3/2003 | Xu | G10L 15/26 704/E15.045 |

(Continued)

*Primary Examiner* — Samuel G Neway
(74) *Attorney, Agent, or Firm* — GREENBLUM & BERNSTEIN, P.L.C.

(57) ABSTRACT

A method for performing a query based on a natural language voice input is provided. The method includes receiving, via a microphone, a voice input of a user, and converting the voice input into a first text data object. The method further includes converting the first text data object into a first technical language object using AI, and submitting a query based on the first technical language object. A query result in a second technical language object is retrieved in response to the query, and the query result is converted into a second text data object using AI. The method further converts the second text object into a voice data object indicating the query result, and outputs a voice signal to provide the information of the query result in a natural language form to the user.

19 Claims, 8 Drawing Sheets

(51) Int. Cl.
*G10L 17/06* (2013.01)
*G10L 17/22* (2013.01)

(56) References Cited

U.S. PATENT DOCUMENTS

| | | | | |
|---|---|---|---|---|
| 2004/0030556 | A1* | 2/2004 | Bennett | G06F 40/289 |
| | | | | 704/E15.04 |
| 2004/0187018 | A1* | 9/2004 | Owen | H04L 9/321 |
| | | | | 713/184 |
| 2011/0195758 | A1* | 8/2011 | Damale | H04M 1/72451 |
| | | | | 455/569.1 |
| 2012/0011134 | A1* | 1/2012 | Travnik | G06F 16/289 |
| | | | | 707/E17.07 |
| 2018/0293300 | A1* | 10/2018 | Liu | G06F 40/289 |
| 2019/0205726 | A1* | 7/2019 | Khabiri | G06N 3/006 |
| 2019/0236155 | A1* | 8/2019 | Bachrach | G06F 40/284 |
| 2020/0051550 | A1* | 2/2020 | Baker | G06N 3/084 |
| 2020/0126540 | A1* | 4/2020 | Panchamgam | G10L 15/26 |
| 2020/0133952 | A1* | 4/2020 | Sheinin | G06N 3/045 |
| 2020/0334233 | A1* | 10/2020 | Lee | G06N 3/045 |
| 2020/0394190 | A1* | 12/2020 | Chaudhuri | G06F 16/243 |
| 2022/0067037 | A1* | 3/2022 | Ranganathan | G10L 15/22 |
| 2022/0138193 | A1* | 5/2022 | Xu | G06F 40/35 |
| | | | | 704/9 |
| 2023/0237281 | A1* | 7/2023 | Yarlagadda | G06F 40/279 |

* cited by examiner

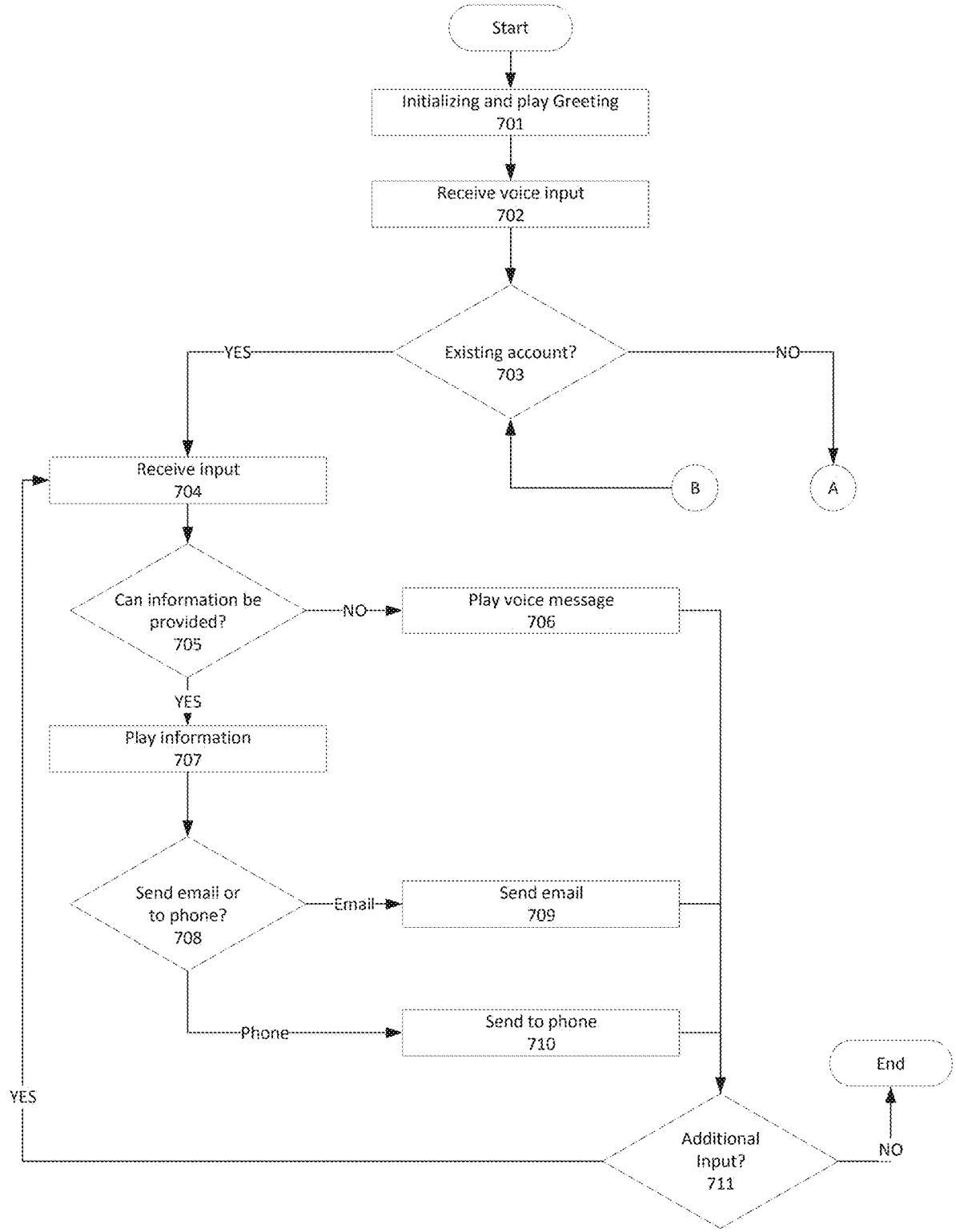

VOICE ASSISTANT SYSTEM AND METHOD FOR PERFORMING VOICE ACTIVATED MACHINE TRANSLATION

TECHNICAL FIELD

This disclosure generally relates to a system and method for performing a machine query based on a natural language voice input, and more specifically, converting the natural language voice input into a machine language object for performing one or more queries from a data hub.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Recently, amount of information acquired by an organization for conducting business has been growing at an exponential rate. The information acquired may be stored in a data store in different formats (data store). Given the ever growing amount of data, finding of desired data insights has become more complex, often requiring high level technical skills that may need frequent updating and/or knowledge of available data to access. Accordingly, only a small number of personnel may be able to access available data for acquiring relevant data insights.

Data store data may be categorized into curated, modeled and reporting areas. Typically, users within an organization may access data from modeled areas to address various ad-hoc business needs. However, such access may require certain level of technical proficiency, and thus leaving only a small population within the organization who may be capable of accessing information being sought. Even then, however, only a small portion (e.g., 20%) of all available data may be accessed due to the complexity and amount of data available for access, providing only a partial or even an incorrect insight of the information being requested. Accordingly, a more accessible system and/or a more effective method for accessing a larger amount of available data is sought for providing a more complete insight of the available data.

SUMMARY

According to an aspect of the present disclosure, a method for performing a query based on a natural language voice input is provided. The method includes receiving, via a microphone and from a user, a voice input; converting, by a processor, the voice input into a first text data object; converting, via an artificial intelligence (AI) engine executed by the processor, the converted first text data object into a first technical language object; submitting, by the processor and to a data store, a query based on the converted first technical language object; retrieving, by the processor and from the data store, a query result in response to the query submitted to the data store, wherein the query result is provided in a second technical language object; converting, via the AI engine executed by the processor, the query result provided in the second technical language object into a second text data object; converting, via the processor, the second text object into a voice data object indicating the query result; and outputting, via a speaker and based on the voice data object, a voice signal to provide information of the query result in a natural language form to the user.

According to another aspect of the present disclosure, the conversion of the first text data object into the first technical language object is performed using a first machine learning model stored in the AI engine, the first machine learning model being updated with a predetermined number of iterations.

According to another aspect of the present disclosure, the conversion of the second technical language object into the second text data object is performed using a second machine learning model stored in the AI engine, the second machine learning model being updated with a predetermined number of iterations.

According to yet another aspect of the present disclosure, the query is an SQL query, and the query result is provided in SQL. According to yet another aspect of the present disclosure, the query is a non-SQL query, and the query result is provided in a format other than SQL According to another aspect of the present disclosure, at least one of the conversion of the voice input to the first text object and conversion of the second text object into the voice data object is performed using JavaScript.

According to a further aspect of the present disclosure, at least one of the conversion of the first text object into the first technical language object, and the conversion of the second technical language object into the second text data object is performed using Python.

According to yet another aspect of the present disclosure, the AI engine updates at least one of its algorithm and a machine learning model after a predetermined number of query operations.

According to a further aspect of the present disclosure, the conversion of the first text data object into the first technical language object and the conversion of the second technical language object into the second text data object are performed over multiple networks, including a cloud network, a semi-cloud network and on-premise network.

According to another aspect of the present disclosure, the method further includes displaying, on a display, visual information corresponding to information provided in the voice signal.

According to a further aspect of the present disclosure, the method further includes automatically generating an email including information corresponding to content provided in the voice signal; and sending the generated email to a target email address.

According to a further aspect of the present disclosure, the method further includes performing a query on the converted first technical language object to acquire metadata of the converted first technical language object; and storing the acquired metadata in a metastore.

According to a further aspect of the present disclosure, the method further includes retrieving metadata corresponding to the second text object from the metastore; and inserting the retrieved metadata into the second text object.

According to a further aspect of the present disclosure, the method further includes receiving, by a bot API endpoint of the AI engine, the first text object for conversion to the first technical language object.

According to a further aspect of the present disclosure, the method further includes sending the converted first technical language object to a data processing; submitting, based on the data processing file, a query based on the converted first technical language object; and receiving, by the data processing file, the query result.

According to another aspect of the present disclosure, the voice input pertains to an inquiry that requests information or a command for performing an operation, for a client.

According to another aspect of the present disclosure, the method further includes authenticating the user based on the voice input received from the user; determining a location of the user; and determining whether the requested information is authorized to be provided for the determined location based on a client profile of the client.

According to another aspect of the present disclosure, the method further includes authenticating the user based on the voice input received from the user; determining a location of the user; and determining whether the requested information is authorized to be provided for the determined location based on a nature of the inquiry or the command.

According to another aspect of the present disclosure, the method further includes identifying relevant terms and irrelevant terms from the first text object; and processing the first text object to remove the irrelevant terms from the first text object, in which the first technical language object is converted from the first text object after the removal of the irrelevant terms from the first text object.

According to another aspect of the present disclosure, the method further includes authenticating a user by comparing a voice input provided by the user against prestored information.

According to another aspect of the present disclosure, the method further includes providing at least one different inquiry or command available for execution based on whether the client has an existing account or not.

According to another aspect of the present disclosure, a system for performing a query based on a natural language voice input is disclosed. The system includes a processor, a memory and a communication circuit. The processor is configured to receive, via a microphone and from a user, a voice input; convert the voice input into a first text data object; convert, via an artificial intelligence (AI) engine, the converted first text data object into a first technical language object; submit, to a data store, a query based on the converted first technical language object; retrieve, from the data store, a query result in response to the query submitted to the data store, wherein the query result is provided in a second technical language object; convert, via the AI engine, the query result provided in the second technical language object into a second text data object; convert, via the processor, the second text object into a voice data object indicating the query result; and output, via a speaker and based on the voice data object, a voice signal to provide information of the query result in a natural language form to the user.

According to another aspect of the present disclosure, a non-transitory computer readable storage medium that stores a computer program for performing a query based on a natural language voice input is disclosed. The computer program, when executed by a processor, causing a system to perform a process including receiving, via a microphone and from a user, a voice input; converting the voice input into a first text data object; converting, via an artificial intelligence (AI) engine, the converted first text data object into a first technical language object; submitting, to a data store, a query based on the converted first technical language object; retrieving, from the data store, a query result in response to the query submitted to the data store, wherein the query result is provided in a second technical language object; converting, via the AI engine, the query result provided in the second technical language object into a second text data object; converting the second text object into a voice data object indicating the query result; and outputting, via a speaker and based on the voice data object, a voice signal to provide information of the query result in a natural language form to the user.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIGS. 7A-7B illustrate a call flow within an interactive voice assistant system in accordance with an exemplary embodiment.

DETAILED DESCRIPTION

Figure 1:
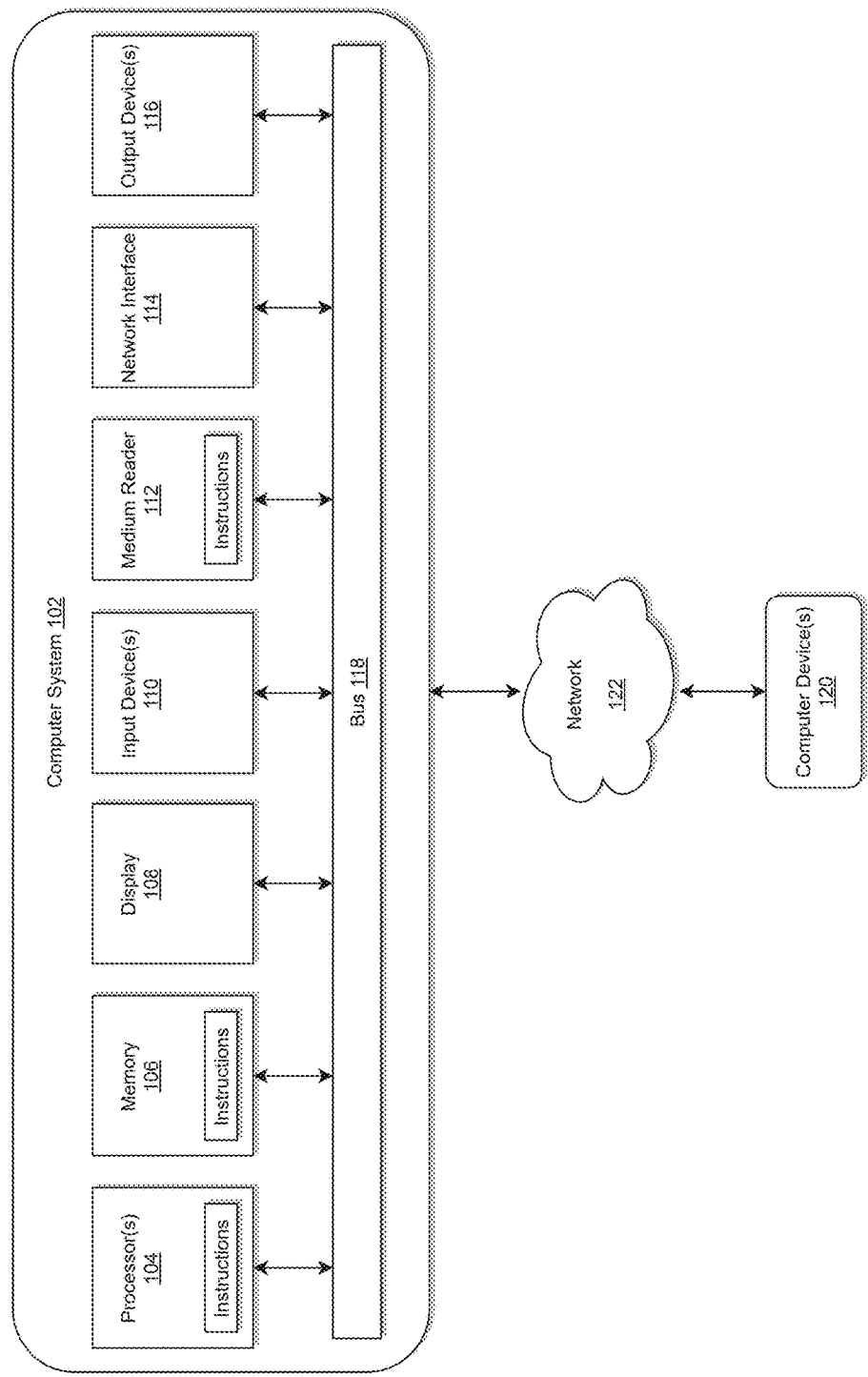
FIG. 1 illustrates a computer system for implementing an interactive voice assistant system for performing machine language queries in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 illustrates a computer system for implementing an interactive voice assistant system for performing machine language queries in accordance with an exemplary embodiment.

The system 100 is generally shown and may include a computer system 102, which is generally indicated. The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The network interface 114 may include, without limitation, a communication circuit, a transmitter or a receiver. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
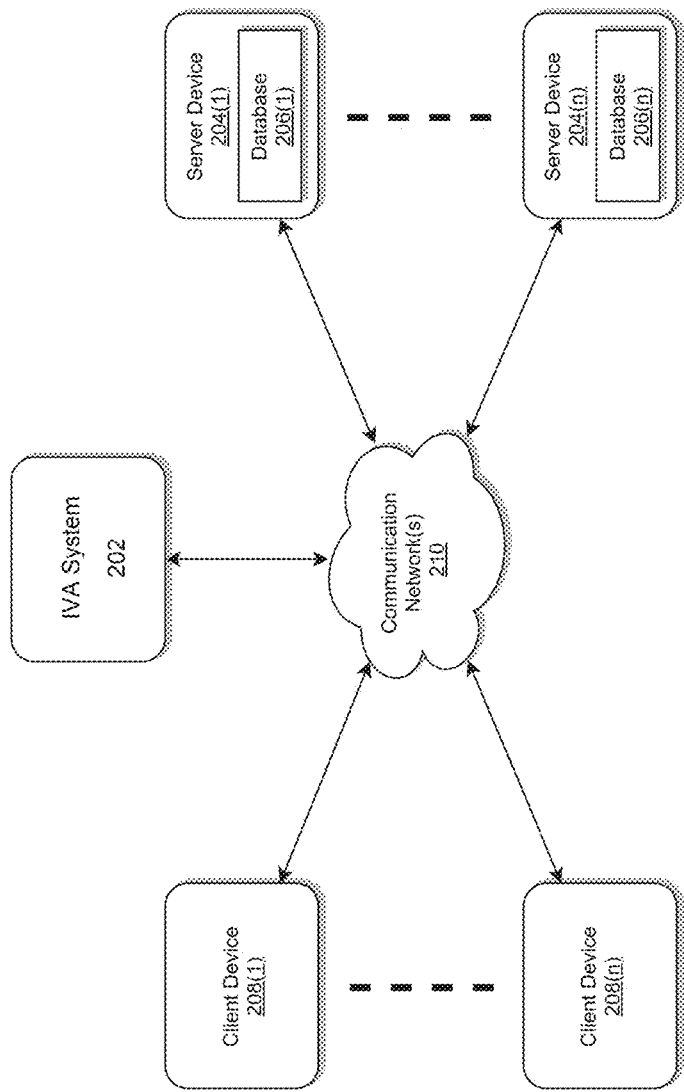
FIG. 2 illustrates an exemplary diagram of a network environment with an interactive voice assistant system for performing machine language queries in accordance with an exemplary embodiment.

FIG. 2 illustrates an exemplary diagram of a network environment with an interactive voice assistant system for performing machine language queries in accordance with an exemplary embodiment.

An interactive voice assistant (IVA) system 202 may be the same or similar to the computer system 102 as described with respect to FIG. 1.

The IVA system 202 may store one or more applications that can include executable instructions that, when executed by the IVA system 202, cause the IVA system 202 to perform actions, such as to execute, transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment or other networking environments. The application(s) may be executed within or as virtual machine(s) or virtual server(s) that may be managed in a cloud-based computing environment. Also, the application(s), and even the IVA system 202 itself, may be located in virtual server(s) running in a cloud-based computing environment rather than being tied to one or more specific physical network computing devices. Also, the application(s) may be running in one or more virtual machines (VMs) executing on the IVA system 202. Additionally, in one or more embodiments of this technology, virtual machine(s) running on the IVA system 202 may be managed or supervised by a hypervisor.

In the network environment 200 of FIG. 2, the IVA system 202 is coupled to a plurality of server devices 204(1)-204(n) that hosts a plurality of databases 206(1)-206(n), and also to a plurality of client devices 208(1)-208(n) via communication network(s) 210. A communication interface of the IVA system 202, such as the network interface 114 of the computer system 102 of FIG. 1, operatively couples and communicates between the IVA system 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the IVA system 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The IVA system 202 may be a standalone device or integrated with one or more other devices or apparatuses, such as one or more of the server devices 204(1)-204(n), for example. In one particular example, the IVA system 202 may be hosted by one of the server devices 204(1)-204(n), and other arrangements are also possible. Moreover, one or more of the devices of the IVA system 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the IVA system 202 via the communication network(s) 210 according to the HTTP-based protocol, for example, although other protocols may also be used. According to a further aspect of the present disclosure, in which the user interface may be a Hypertext Transfer Protocol (HTTP) web interface, but the disclosure is not limited thereto.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the IVA system 202 that may efficiently provide a platform for implementing a cloud native IVA module, but the disclosure is not limited thereto.

The client devices 208(1)-208(n) may run interface applications, such as standard web browsers or standalone client applications, which may provide an interface to communicate with the IVA system 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the IVA system 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the IVA system 202, the server devices 204(1)-204(n), or the client devices 208(1)-208(n), for example, may be configured to operate as virtual instances on the same physical machine. For example, one or more of the IVA system 202, the server devices 204(1)-204(n), or the client devices 208(1)-208(n) may operate on the same physical device rather than as separate devices communicating through communication network(s) 210. Additionally, there may be more or fewer IVA systems 202, server devices 204(1)-204(n), or client devices 208(1)-208(n) than illustrated in FIG. 2. According to exemplary embodiments, the IVA system 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
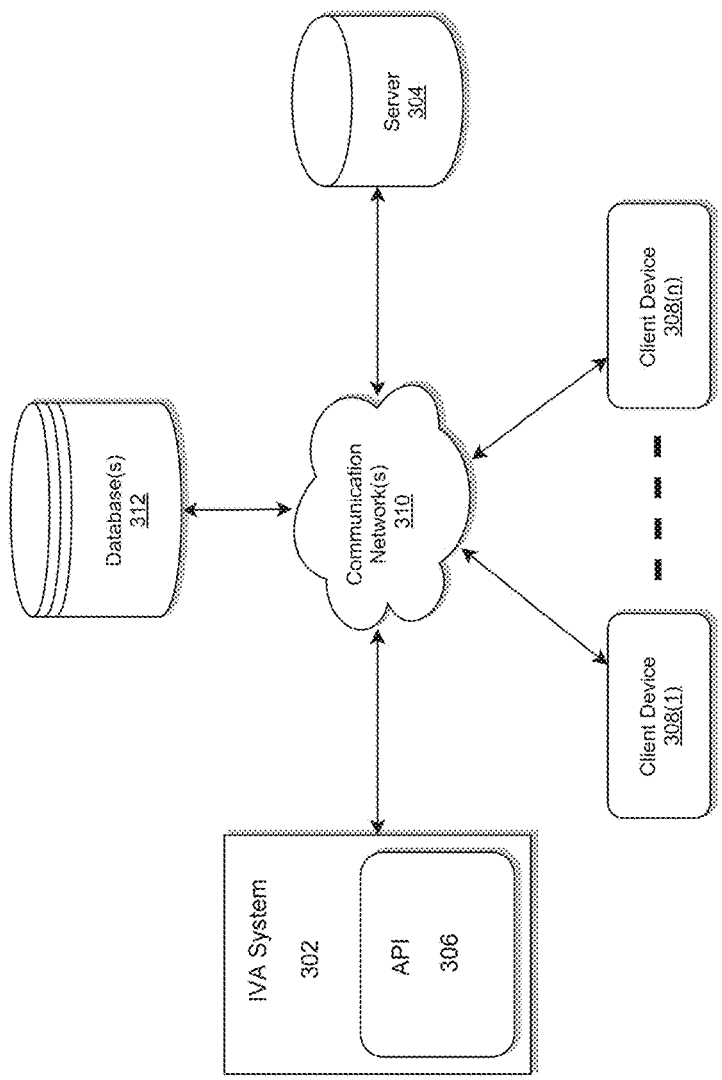
FIG. 3 illustrates a system diagram for implementing an interactive voice assistant system for performing machine language queries in accordance with an exemplary embodiment.

FIG. 3 illustrates a system diagram for implementing an interactive voice assistant system for performing machine language queries in accordance with an exemplary embodiment.

As illustrated in FIG. 3, the system 300 may include an IVA system 302 within which a group of API modules 306 is embedded, a server 304, a database(s) 312, a plurality of client devices 308(1) . . . 308(n), and a communication network 310.

According to exemplary embodiments, the IVA system 302 including the API modules 306 may be connected to the server 304, and the database(s) 312 via the communication network 310. Although there is only one database has been illustrated, the disclosure is not limited thereto. Any number of databases may be utilized. The IVA System 302 may also be connected to the plurality of client devices 308(1) . . . 308(n) via the communication network 310, but the disclosure is not limited thereto.

According to exemplary embodiment, the IVA system 302 is described and shown in FIG. 3 as including the API modules 306, although it may include other rules, policies, modules, databases, or applications, for example. According to exemplary embodiments, the database(s) 312 may be embedded within the IVA system 302. According to exemplary embodiments, the database(s) 312 may be configured to store configuration details data corresponding to a desired data to be fetched from one or more data sources, user information data etc., but the disclosure is not limited thereto.

According to exemplary embodiments, the API modules 306 may be configured to receive real-time feed of data or data at predetermined intervals from the plurality of client devices 308(1) . . . 308(n) via the communication network 310.

The API modules 306 may be configured to implement a user interface (UI) platform that is configured to enable IVA as a service for a desired data processing scheme. The UI platform may include an input interface layer and an output interface layer. The input interface layer may request preset input fields to be provided by a user in accordance with a selection of an automation template. The UI platform may receive user input, via the input interface layer, of configuration details data corresponding to a desired data to be fetched from one or more data sources. The user may specify, for example, data sources, parameters, destinations, rules, and the like. The UI platform may further fetch the desired data from said one or more data sources based on the configuration details data to be utilized for the desired data processing scheme, automatically implement a transformation algorithm on the desired data corresponding to the configuration details data and the desired data processing scheme to output a transformed data in a predefined format, and transmit, via the output interface layer, the transformed data to downstream applications or systems.

The plurality of client devices 308(1) . . . 308(n) are illustrated as being in communication with the IVA system 302. In this regard, the plurality of client devices 308(1) . . . 308(n) may be "clients" of the IVA system 302 and are described herein as such. Nevertheless, it is to be known and understood that the plurality of client devices 308(1) . . . 308(n) need not necessarily be "clients" of the IVA system 302, or any entity described in association therewith herein. Any additional or alternative relationship may exist between either or both of the plurality of client devices 308(1) . . . 308(n) and the IVA system 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the IVA system 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The IVA system 302 may be the same or similar to the IVA system 202 as described with respect to FIG. 2, including any features or combination of features described with respect thereto.

Figure 4:
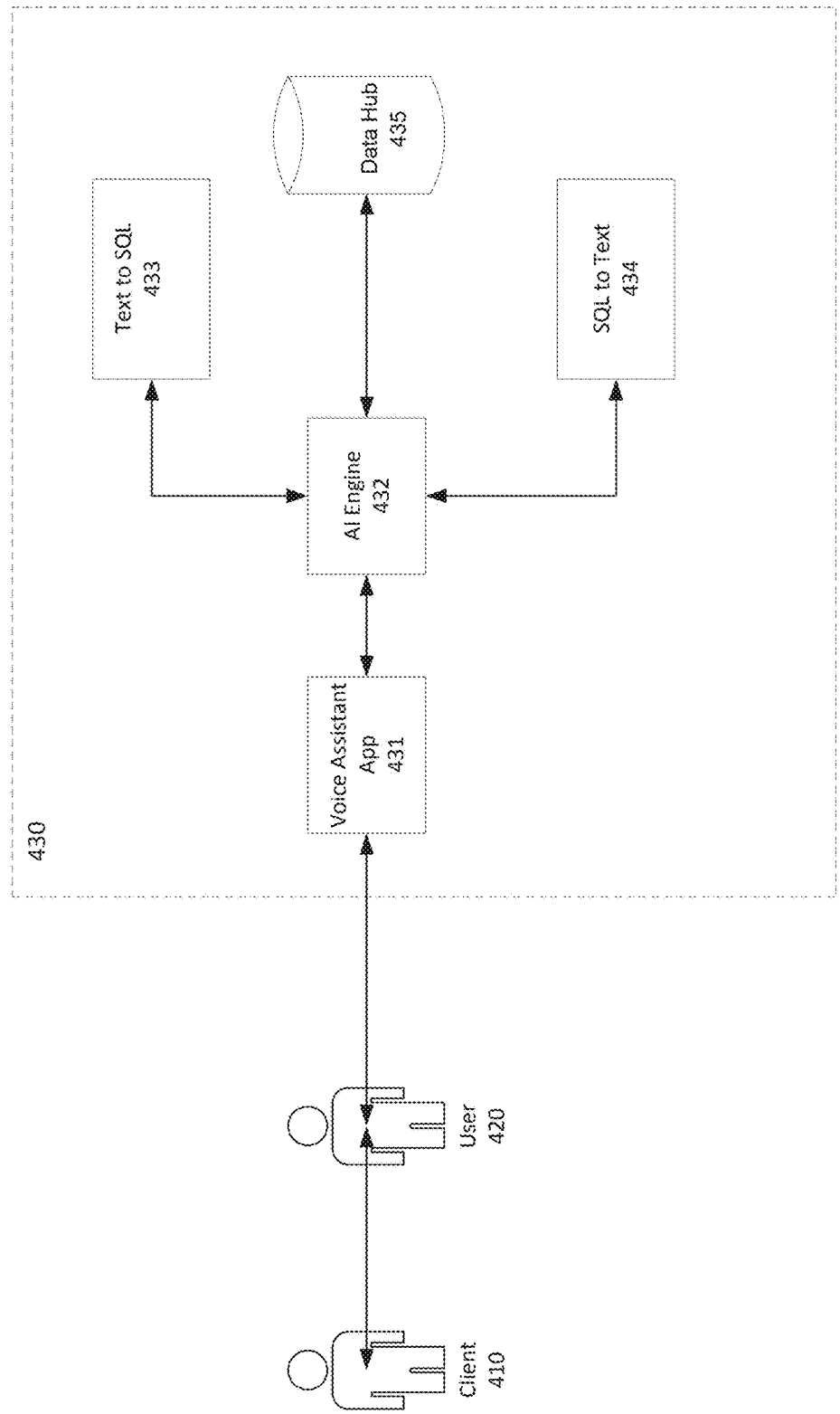
FIG. 4 illustrates an interactive voice assistant system diagram in accordance with an exemplary embodiment.

FIG. 4 illustrates an interactive voice assistant system diagram in accordance with an exemplary embodiment.

As exemplarily illustrated in FIG. 4, a system user 420 may leverage an interactive voice assistant (IVA) system 430 when interacting with a client 410. In an example, the system user 420 may be a business user having appropriate access credentials for accessing the IVA system 430. Although FIG. 4 is illustrated with only the system user 420 having access to the IVA system 430, aspects of the present disclosure are not limited thereto, such that the client 410 may be able to access an instance of the IVA system 430 without intervention from the system user 420. Further, one or both of the client 410 and the system user 420 may correspond to a person or a machine being utilized by the person.

In an example, the client 410 and the system user 420 may perform communications with one another. According to aspects, the client 410 and the system user 420 may engage in verbal communication, written communication, motion communication, a combination of the above and/or the like. Further, the client 410 and the system user 420 may perform voice communication in-person, by telephone, via video conferencing or the like.

When the system user 420 needs to access the IVA system 430 to provide information to the client 410, the system user 420 may provide a verbal input to the IVA system 430. In an example, the IVA system 430 may be initialized for receiving a voice input by performing a triggering operation. The triggering operation may include providing a touch input or providing a key phrase. However, aspects of the disclosure are not limited thereto, such that no triggering operation may be necessary. The verbal input provided by the system user 420 may be initially received by a voice assistant app 431 of the IVA system 430.

In an example, the voice assistant app 431 may provide an interface for the system user 420, and may provide a display of information as well as a voice output. The displayed information may correspond to the voice output, and may additionally provide supplemental information. The voice assistant app 431 may also convert the received voice input into a text format to generate a converted text data object. In an example, conversion of the voice data inputted to the text data object may be performed in real time. Further, the conversion may be performed using JavaScript.

Further, the voice assistant app 431 may perform the voice to text transcription based on a machine learning (ML) or artificial intelligence (AI) model. In an example, AI or ML algorithms may be executed to perform data pattern detection, and to provide an output based on the data pattern detection. More specifically, an output may be provided based on a historical pattern of data, such that with more data or more recent data, more accurate outputs may be provided. Accordingly, the ML or AI models may be constantly updated after a predetermined number of runs or iterations. According to exemplary aspects, machine learning may refer to computer algorithms that may improve automatically through use of data. Machine learning algorithm may build an initial model based on sample or training data, which may be iteratively improved upon as additional data are acquired.

More specifically, machine learning/artificial intelligence and pattern recognition may include supervised learning algorithms such as, for example, k-medoids analysis, regression analysis, decision tree analysis, random forest analysis, k-nearest neighbors analysis, logistic regression analysis, 5-fold cross-validation analysis, balanced class weight analysis, and the like. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, and the like.

In another exemplary embodiment, the ML or AI model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the ML or AI model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the ML or AI models may be generated using at least one from among an artificial neural network technique, a decision tree technique, a support vector machines technique, a Bayesian network technique, and a genetic algorithms technique.

The AI engine 432 receives the translated text input from the voice assistant app 431, and performs a conversion from the translated text input object to a technical language (e.g., SQL or other suitable technical or machine language) to generate a converted technical language object, such as text to SQL converted object 433. Once the text to SQL converted object 433 is generated, metadata may additionally be queried from the text to SQL converted object 433 by a metastore. In an example, the metastore may refer to a central repository of Hive metadata. More specifically, the metastore may store metadata for Hive tables and partitions in a relational database. The metastore may be accessed via a metastore service API.

The text to SQL converted object 433 is then provided to the AI engine 432 for the AI engine 432 to execute a query, such as a SQL query, against a data hub 435. In an example, the data hub 435 may include one or more data stores and may store curated data, modeled data, and report data. According to exemplary aspects, curated data may store data from chat sessions, search histories, telephone conversations and the like. The data hub 435 may retrieve a query result in response to the query submitted by the AI engine 432. In an example, the query result may be provided in a technical language that is the same as the technical language utilized for submitting the query to the data hub 435. However, aspects of the present disclosure are not limited thereto, such that the query result may be returned in a different technical language.

Upon receiving a query result from the data hub 435, the AI engine 432 may convert the technical language (e.g., SQL) providing the query result into a natural language text, to generate a SQL to text converted object 434. In an example, the SQL to text converted object 434 may further receive an input of metadata from the metastore. Further to the above, the AI engine 432 may modify an order of the text provided in the SQL to text converted object 434, and may also add additional language to configure the text to be read in a more natural form (e.g., a complete sentence) normally spoken by people.

The SQL to text converted object 434 including the query results may be sent to the voice assistant app 431. The voice assistant app 431, upon receipt of the SQL to text converted object 434, may perform processing to convert the text information included in the SQL to text converted object 434 into a voice signal. The voice assistant app 431 may then output the voice signal to the system user 420 via a speaker. Further, the text information may additionally be provided in a visual format on a display. In an example, the text information may correspond to content of the voice signal and/or supplement thereto.

Figure 5:
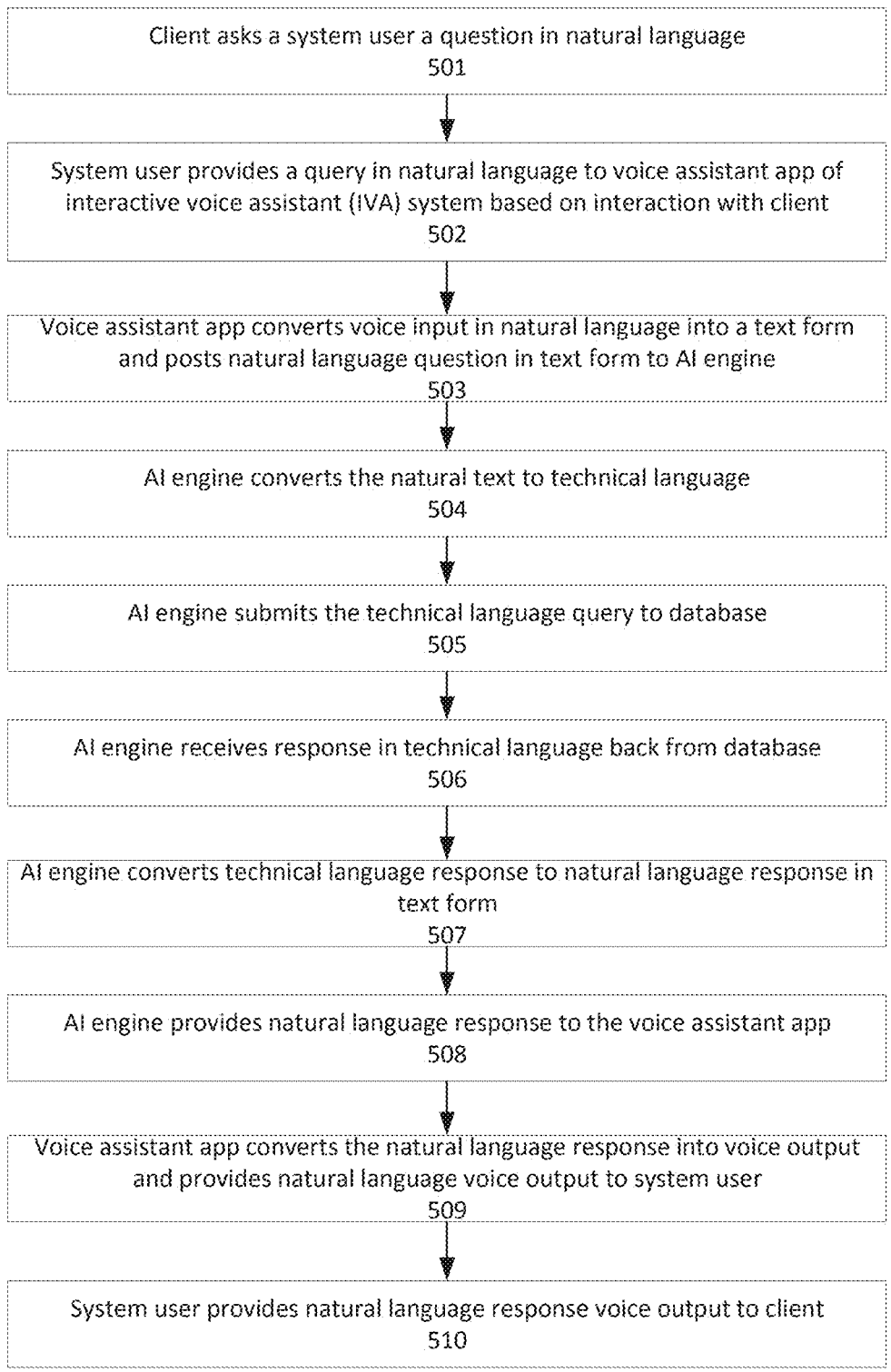
FIG. 5 illustrates a method for performing machine language queries using an interactive voice assistant system for in accordance with an exemplary embodiment.

FIG. 5 illustrates a method for performing machine language queries using an interactive voice assistant system for in accordance with an exemplary embodiment.

In operation 501, a client asks a system user a question in natural language. In an example, the system user may be authorized to access an interactive voice assistant (IVA) system, whereas the client may not be.

In operation 502, the system user provides a query in natural language to a voice assistant app of the IVA system based on the interaction with the client. The system user may provide the query in consideration of various information the client may have provided along with the system user's own information. According to exemplary aspects, the voice assistant app may act as an interface between the system user and the IVA system. The voice assistant app may also control displaying of output information and/or providing of voice output. In an example, the displayed output information may correspond to the voice output, and/or may supplement the voice output.

In operation 503, the voice assistant app coverts the voice input provided in natural language into a text form, and then posts the natural language question in the text form as a converted text data object to an AI engine. In an example, the AI engine may be stored within the IVA system or on a private or centralized cloud network.

In operation 504, the AI engine converts the natural language text provided in the text data object into a technical language, and generates a converted technical language object. According to exemplary aspects, and without limitation, the technical language may be SQL. In an example, the AI engine may utilize one or more machine learning or artificial intelligence algorithms and/or models to identify relevant text and extraneous text for the conversion. The extraneous text may then be removed from consideration, and the AI engine may perform the conversion to the technical language based on the relevant text identified. According to exemplary aspects, based on one or more pattern recognition, certain text may be given higher or lower weights that may be utilized in the conversion. Further, the conversion to the machine language may be based on information of the client and/or the system user. However, aspects of the present disclosure are not limited thereto, such that the machine learning or artificial intelligence algorithms and/or models may leverage other sources of information for performing the conversion of the transcribed text input of the natural language query provided by the system user to a corresponding technical language query. In an example, the technical language may include, without limitation, SQL or other query or programming languages.

In operation 505, the AI engine submits the converted technical language object or query to one or more data stores included in a data hub for retrieval. In an example, the one or more data stores being queried may include a data store stored within the IVA system or a set of centralized data stores residing on a network as a data hub.

In operation 506, the AI engine receives a response in technical language object back from the data hub. In an example, the response may be an SQL query result retrieved in response to the converted technical language object inputted to the data hub.

In operation 507, the AI engine converts the technical language response object into a natural language text object. For example, the AI engine may convert the received technical language response object, such as SQL query results, into a natural language response object. Further, the natural language response object may be contextualized based on the submitted inputs, and provided in a sentence form by the AI engine for easier understanding, such that an ordinary user without technical skills may be able to understand the information being presented.

Further, the natural language response object may be in a text format or in other suitable format. Contents of the natural language response object may or may not be provided on a display. However, aspects of the present disclosure are not limited thereto, such that the AI engine may identify and retrieve a document or file corresponding to the technical language response. Alternatively, the AI engine may generate a graphical image or information based on the technical language response.

In operation 508, the AI engine provides the natural language response object to the voice assistant app. In an example, the natural language response object may be provided in a text form, or in other suitable forms.

In operation 509, the voice assistant app converts the natural language response object into a voice output and provides the natural language voice output to the system user. Although the present description discloses providing the voice output to the system user, aspects of the disclosure are not limited thereto, such that the natural language response may be provided in a written form for security. Further, certain information may be configured to be provided in a written form on a display whereas other information may be provided as a voice output via a speaker based on nature of the information being provided.

In operation 510, the system user relays the information received from the voice assistant app of the IVA system and verbally provides the response to the client (via phone, in-person, video conferencing and the like). However, aspects of the present disclosure are not limited thereto, such that certain information or the entire response retrieved/generated by the IVA system may be provided directly to the client's device via an electronic communication (e.g., email, web-based messaging, text message, file, voicemail, and the like).

Figure 6:
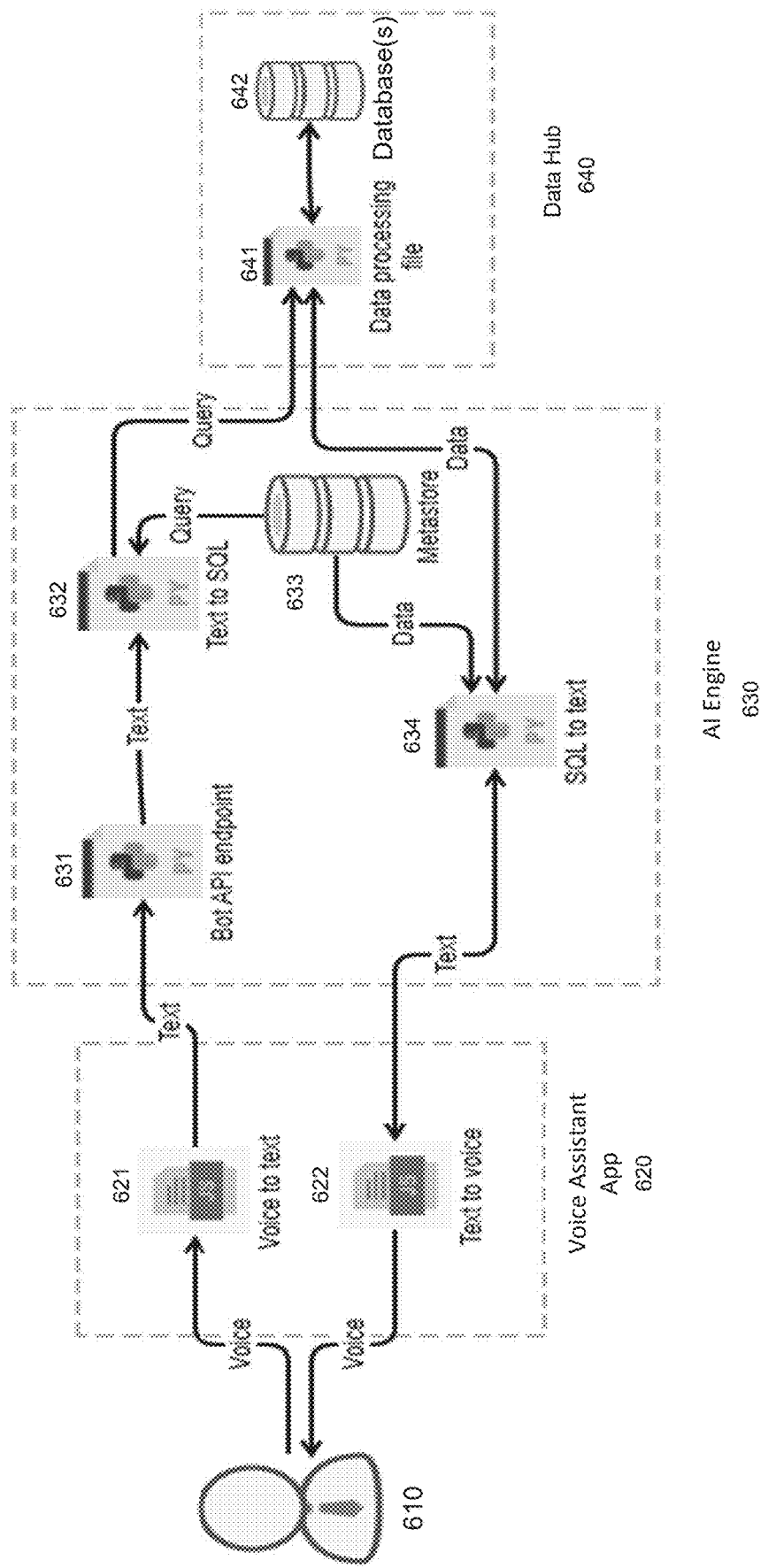
FIG. 6 illustrates a process flow within an interactive voice assistant system in accordance with an exemplary embodiment.

FIG. 6 illustrates a process flow within an interactive voice assistant system in accordance with an exemplary embodiment.

In FIG. 6, interactions between a system user 610, a voice assistant app 620, AI engine 630, and a data hub 640 are illustrated. In an example, a combination of the voice assistant app 620, the AI engine 630 and the data hub 640 forms an IVA system.

The system user 610 interfaces with the voice assistant app 620. The system user 610 may interact with the voice assistant app 620 using a voice input. The voice assistant app 620 receive the voice input from the system user 610 via a microphone. The voice assistant app 620 may also provide a voice output to the system user 610 using a speaker. However, aspects of the present disclosure are not limited thereto, such that the voice assistant app 620 may additionally provide visual output on a display. The visual output may include, without limitation, texts, images, videos, holograms or the like.

The voice assistant app 620 may receive a voice input from the system user 610, converts the received voice input into a text data object 621, and transmits the converted text data object 621 to the AI engine 630. In an example, conversion of the voice input into the text data object 621 may be performed using JavaScript or other suitable coding language.

The converted text data object may be received by a bot API endpoint 631. In an example, the bot API endpoint 631 may be provided in Python. However, aspects of the present disclosure are not limited thereto, such that any suitable programming language may be utilized to configure the bot API endpoint. In an example, a bot may refer to a third party applications that may receive messages, commands, or inline requests. Further, an API endpoint may refer to a point at which an API, which may include code that allows two software programs to communicate with one another, connects with a software program.

The bot API endpoint 631 receives the converted text data object from the voice assistant app 620, and sends the converted text data object for conversion to a technical language, such as SQL or any other suitable technical language, for generating a converted technical language object 632. The converting of the text data to the technical language may be performed using Python in combination with machine learning or artificial intelligence algorithms and/or models. In an example, the converted technical language object 632 may include SQL. However, aspects of the present disclosure are not limited thereto, such that the converted technical language object 632 may be configured in a different programming language.

Further, the converted technical language object 632 additionally receive a query from a metastore 633 for obtaining metadata. In an example, the metastore 633 may refer to a central repository of Hive metadata. The metastore 633 may store metadata for Hive tables and partitions in a relational database.

Then, the converted technical language object 632, which has been queried by the metastore 633, is transmitted as a query to a data processing file 641 of the data hub 640. According to exemplary aspects, the data hub 640 may include one or more data stores and may store, without limitation, curated data, modeled data and report data. For example, curated data may store data from chat sessions, search histories, telephone conversations and the like. According to further exemplary aspects, the data processing file 641 may be configured in Python, and may convert raw data into a format readable by one or more data stores 642. The data processing file 641 is submitted to the one or more data stores 642 to retrieve a query result from the one or more data stores 642 for the query based on the converted technical language object 632. The retrieved query result data, which may be provided in the technical language, such as SQL, is then sent back as a technical language object to the AI engine 630 for conversion to a text object 634. In an example, the converting of the technical language to the text data may be performed using machine learning or artificial intelligence algorithms and/or models. Moreover, conversion from the technical language object to the text object 634 may be performed using Python or any other suitable programming language. Metadata may be provided from the metastore 633 to the converted text object 634.

The converted text object 634 is then transmitted back to the voice assistant app 620. The voice assistant app 620 then converts the received text object 634 into voice data object 622. In an example, conversion of the voice data object 622 may be performed by JavaScript or other suitable programming language. The voice data object 622 is then processed to be outputted as a voice signal to the system user 610 using a speaker. Although not illustrated, corresponding or supplemental visual information (e.g., text, images, videos, or the like) may also be provided on a display, or sent as a separate communication in an email or other forms of communication.

Figure 7B:
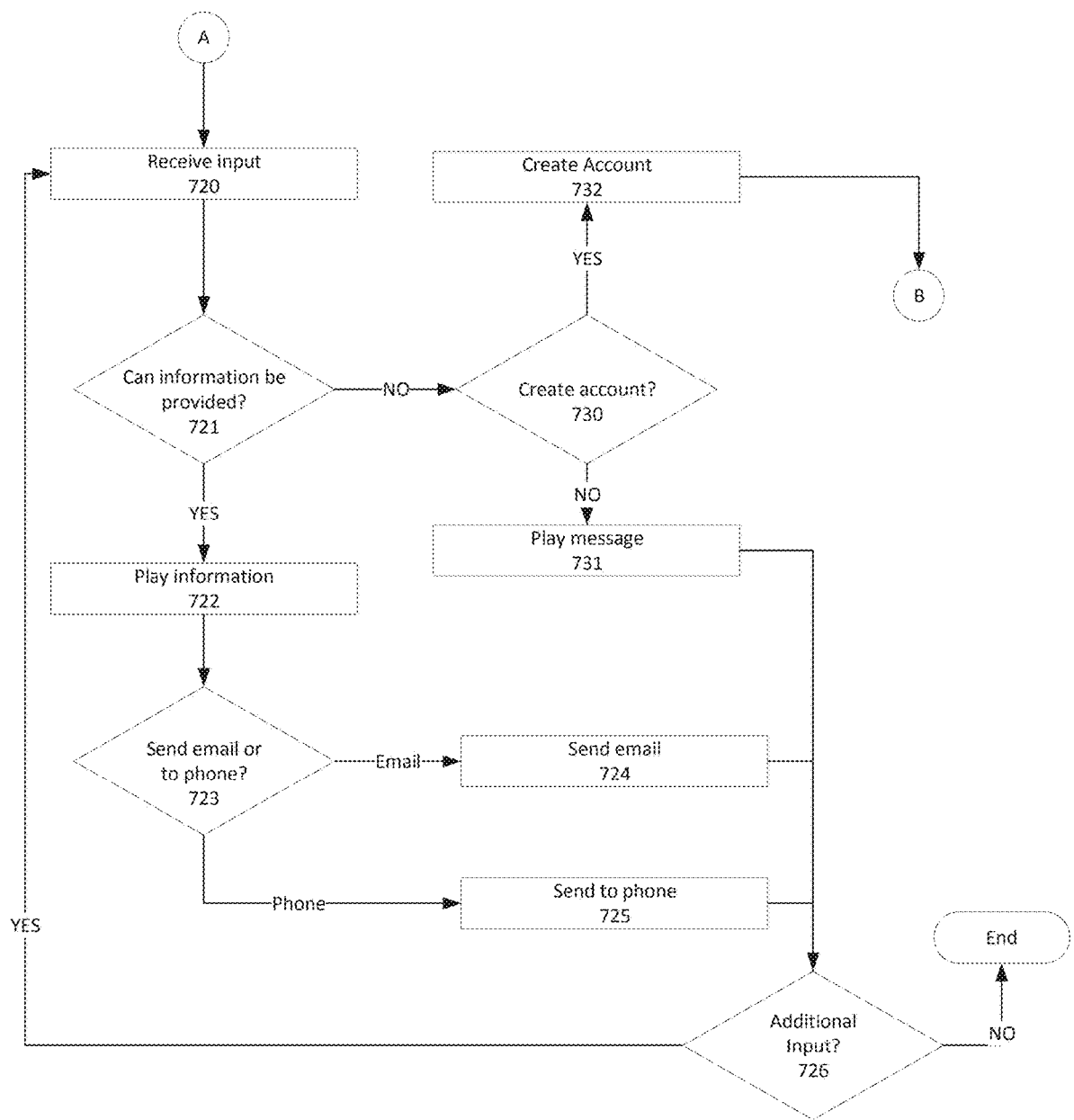

FIGS. 7A-7B illustrate a call flow within an interactive voice assistant system in accordance with an exemplary embodiment.

In operation 701, the interactive voice assistant (IVA) system may be initialized and plays a greeting message. For example, the IVA system may be initialized by providing a physical input, stating a trigger phrase, a motion detection, a voice from a predetermined person, or the like. However, aspects of the present disclosure are not limited thereto, such that the IVA system may be initialized anytime it detects a voice input of a certain volume. The greeting message may be a standardized message or may be personalized to a particular user.

In operation 702, a voice input may be received from a system user. In an example, the voice input may be received and processed upon receipt. In another example, the voice input may be authenticated against prestored information, such as another prestored recording, facial recognition, or the like.

In operation 703, the IVA system performs a check as to whether a client being served by the system user has an existing account or not based on a client profile. Further, a location of the client being served may also be determined. In an example, such a check may be performed based on client information or profile (e.g., name, phone number, email address, user ID, and/or etc.) provided by the system user. In another example, a check may be performed based on a voice input provided by the client, facial image of the client, or the like. If the IVA system determines that the existing account is present for the client, then the call flow proceeds to operation 704. Alternatively, if the IVA system determines that there is no existing account for the client, then the IVA system determines that the client may be a prospective client, and the call flow proceeds to operation 720 in FIG. 7B.

In operation 704, a voice input is provided to the IVA system. In an example, the voice input may be provided in a free form natural language based inquiry or command. For example, the system user may pose one or more of the following inquiries or commands: "who is the primary banker?", "what is the account balance for the client?", "what products is the client currently subscribed to?", "send me the firmographics", "save firmographics to phone" or the like.

In operation 705, a determination is made as to whether the requested information or command may be provided or executed. For example, the requested information may be unavailable, or unable to be provided based on a security profile of the client. Further, a determination is made as to whether the requested information or command may be provided or executed based on a location of the client or the system user. In an example, different information or commands may be available in different locations.

If the information is unavailable or the command is unable to be executed, a voice message may be provided to the system user of such fact in operation 706. However, aspects of the present disclosure are not limited thereto, such that written information may be provided in addition to the voice message or as an alternative thereto.

If the information is available or the command is able to be executed, then the information is provided in a voice message in operation 707. However, aspects of the present disclosure are not limited thereto, such that written information may be provided in addition to the voice message or as an alternative thereto.

In operation 708, a determination of whether the information provided in operation 707 or information corresponding thereto (e.g., summary of information provided in operation 707, follow up appointment information, contact information, and/or the like) is to be provided via email or phone is made. Although only email or phone options are provided in operation 708, aspects of the present disclosure are not limited thereto, such that such information may be sent via a chat message, web-based message, provided as a printed report or the like.

If the information is to be sent via email in operation 708, an email may be automatically generated and sent to a target email address, such as the client's email address on file, in operation 709.

If the information is to be sent to the client's phone in operation 708, information may be transmitted to a target phone number, such as the client's phone number on file, in operation 710. The respective information may be sent via a text message, a chat message, a voice mail, or the like.

In operation 711, the IVA system further asks the system user if the system user has additional inquiries or commands to provide. If the user has additional inquiries or commands, then the process flows proceeds back to operation 704 for receiving further voice input from the system user. Alternatively, if the user does not have any further inquiry or command, then the process flow terminates.

In operation 720 illustrated in FIG. 7B, a voice input by a prospective client that does not have an existing account is provided to the IVA system. In an example, the voice input may be a free form natural language based inquiry or command. For example, the system user may pose one or more of the following inquiries or commands: "Look up [client A]", "Send me the firmographics", and "Save C suite info" or the like.

In operation 721, a determination of whether the requested information can be provided to the prospective client based on a location of the prospective client. In an example, certain information may be provide to only to the existing clients, whereas other information may be provided for all individuals. Further, differing information may be provided according to the location of the prospective client. If the information cannot be provided to non-clients, the prospective client or non-client may be provided with an option to create an account in operation 730. If the prospective client or the non-client agrees to create an account, then the process flow will be directed to operation 732. If the prospective client or the non-client opts not to create an account, then a voice message indicating that the request information may not be provided is played in operation 731. Subsequently, the IVA system checks if additional input/inquiry/command is provided in operation 726.

On the other hand, if the information can be provided to the existing clients, the requested information may be played to the system user in operation 722. Further, the IVA system checks whether the information provided in operation 722 should also send an email or to a phone in operation 723. If the information is to be sent via email in operation 723, an email may be automatically generated and sent to a requested or target email address in operation 724. In an example, the requested email may be an email of the prospective client provided to the system user. Upon sending of the email in operation 724, the IVA system checks if additional input/inquiry/command is provided in operation 726.

If the information is to be sent to the client's phone in operation 723, information may be transmitted to a requested phone number or a target phone number in operation 725. The respective information may be sent via a text message, a chat message, a voice mail, or the like. In an example, the requested email may be a phone number of the prospective client provided to the system user. Upon sending of the requested information in operation 725, the IVA system checks if additional input/inquiry/command is provided in operation 726.

If the prospective client has additional input/inquiry/command in operation 726, the process flow proceeds to operation 720 to acquire additional input/inquiry/command from the prospective client. If the prospective client does not have any additional input/inquiry/command in operation 726, the process flow terminates.

Further, although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for performing a query based on a natural language voice input, the method comprising:
   receiving, via a microphone and from a user, a voice input;
   converting, by a processor, the voice input into a first text data object;
   converting, via an artificial intelligence (AI) engine executed by the processor, the first text data object into a first technical language object;
   querying, by a metastore, metadata from the first technical language object;
   submitting, by the processor and to a data store, a query based on the first technical language object;
   retrieving, by the processor and from the data store, a query result in response to the query submitted to the data store, wherein the query result is provided in a second technical language object;
   converting, via the AI engine executed by the processor, the query result provided in the second technical language object into a second text data object;
   receiving, from the metastore, an input of metadata for the second text data object;
   converting, via the processor, the second text data object into a voice data object indicating the query result;
   contextualizing the voice data object based on the voice input and the input of metadata;
   outputting, via a speaker and based on the voice data object, a voice signal to provide information of the query result in a natural language form to the user;
   outputting, on a display, visual information that supplements the voice signal; and
   transmitting, to a computing device of the user, a select portion of the voice signal in an electronic communication.

2. The method according to claim 1, wherein the conversion of the first text data object into the first technical language object is performed using a first machine learning model stored in the AI engine, the first machine learning model being updated with a predetermined number of iterations.

3. The method according to claim 1, wherein the conversion of the second technical language object into the second text data object is performed using a second machine learning model stored in the AI engine, the second machine learning model being updated with a predetermined number of iterations.

4. The method according to claim 1, wherein the query is an SQL query, and the query result is provided in SQL.

5. The method according to claim 1, wherein at least one of the conversion of the voice input to the first text data object and conversion of the second text data object into the voice data object is performed using JavaScript.

6. The method according to claim 1, wherein at least one of the conversion of the first text data object into the first technical language object, and the conversion of the second technical language object into the second text data object is performed using Python.

7. The method according to claim 1, wherein the conversion of the first text data object into the first technical language object and the conversion of the second technical language object into the second text data object are performed over a cloud network.

8. The method according to claim 1,
   wherein the transmitting includes:
   automatically generating an email including information corresponding to content provided in the voice signal; and
   sending the generated email to a target email address.

9. The method according to claim 1, further comprising:
   receiving, by a bot API endpoint of the AI engine, the first text data object for conversion to the first technical language object.

10. The method according to claim 1, further comprising:
    sending the first technical language object to a data processing file;
    submitting, based on the data processing file, a query based on the first technical language object; and
    receiving, by the data processing file, the query result.

11. The method according to claim 1, wherein the voice input pertains to an inquiry that requests information or a command for performing an operation, for a client.

12. The method according to claim 11, further comprising:
    authenticating the user based on the voice input received from the user;
    determining a location of the user; and
    determining whether the requested information is authorized to be provided for the determined location based on a client profile of the client.

13. The method according to claim 11, further comprising:
    authenticating the user based on the voice input received from the user;
    determining a location of the user; and
    determining whether the requested information is authorized to be provided for the determined location based on a nature of the inquiry or the command.

14. The method according to claim 1, further comprising:
    identifying relevant terms and irrelevant terms from the first text data object; and
    processing the first text data object to remove the irrelevant terms from the first text data object, wherein the first technical language object is converted from the first text data object after the removal of the irrelevant terms from the first text data object.

15. The method according to claim 11, further comprising:
providing at least one different inquiry or command available for execution based on whether the client has an existing account or not.

16. A system for performing a query based on a natural language voice input, the system comprising:
at least one processor;
at least one memory; and
at least one communication circuit,
wherein the at least one processor is configured to:
receive, via a microphone and from a user, a voice input;
convert the voice input into a first text data object;
convert, via an artificial intelligence (AI) engine, the first text data object into a first technical language object;
query, by a metastore, metadata from the first technical language object;
submit, to a data store, a query based on the first technical language object;
retrieve, from the data store, a query result in response to the query submitted to the data store, wherein the query result is provided in a second technical language object;
convert, via the AI engine, the query result provided in the second technical language object into a second text data object;
receive, from the metastore, an input of metadata for the second text data object;
convert, via the processor, the second text data object into a voice data object indicating the query result;
contextualize the voice data object based on the voice input and the input of metadata;
output, via a speaker and based on the voice data object, a voice signal to provide information of the query result in a natural language form to the user;
output, on a display, visual information that supplements the voice signal; and
transmit, to a computing device of the user, a select portion of the voice signal in an electronic communication.

17. A non-transitory computer readable storage medium that stores a computer program for performing a query based on a natural language voice input, the computer program, when executed by a processor, causing a system to perform a process comprising:
receiving, via a microphone and from a user, a voice input;
converting the voice input into a first text data object;
converting, via an artificial intelligence (AI) engine, the first text data object into a first technical language object;
querying, by a metastore, metadata from the first technical language object;
submitting, to a data store, a query based on the first technical language object;
retrieving, from the data store, a query result in response to the query submitted to the data store, wherein the query result is provided in a second technical language object;
converting, via the AI engine, the query result provided in the second technical language object into a second text data object;
receiving, from the metastore, an input of metadata for the second text data object;
converting the second text data object into a voice data object indicating the query result;
contextualizing the voice data object based on the voice input and the input of metadata;
outputting, via a speaker and based on the voice data object, a voice signal to provide information of the query result in a natural language form to the user;
outputting, on a display, visual information that supplements the voice signal; and
transmitting, to a computing device of the user, a select portion of the voice signal in an electronic communication.

18. The method according to claim 1, wherein the electronic communication is one of an email, web-based messaging, text message, data file or a voicemail.

19. The method according to claim 1, wherein the visual information includes at least one of a text, image, video and hologram.

* * * * *